Feb. 21, 1967  T. H. HESS, SR., ETAL  3,304,824
BAR HANDLING AND SHEARING MACHINE
Filed July 2, 1965                                    3 Sheets-Sheet 1

INVENTORS
THURLOW H. HESS SR.
WERTEN DALE BROUGHER

BY

ATTORNEY

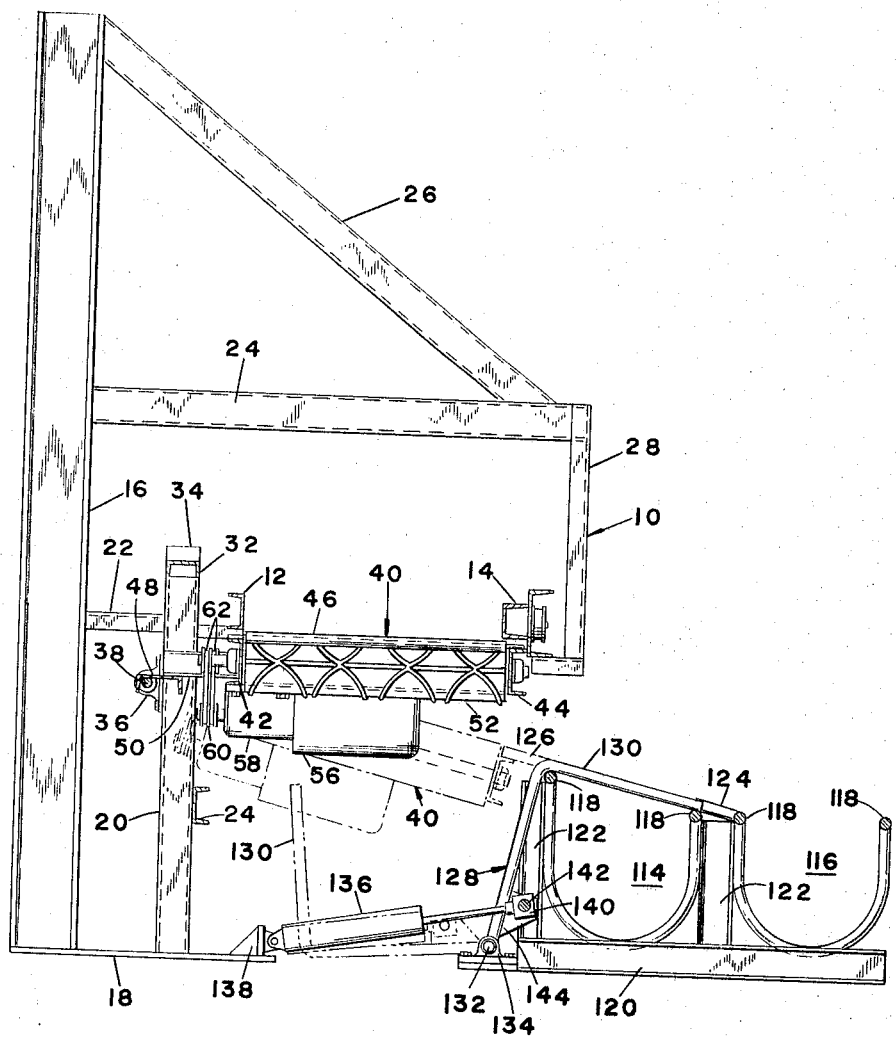

Feb. 21, 1967 T. H. HESS, SR., ET AL 3,304,824
BAR HANDLING AND SHEARING MACHINE
Filed July 2, 1965 3 Sheets-Sheet 3
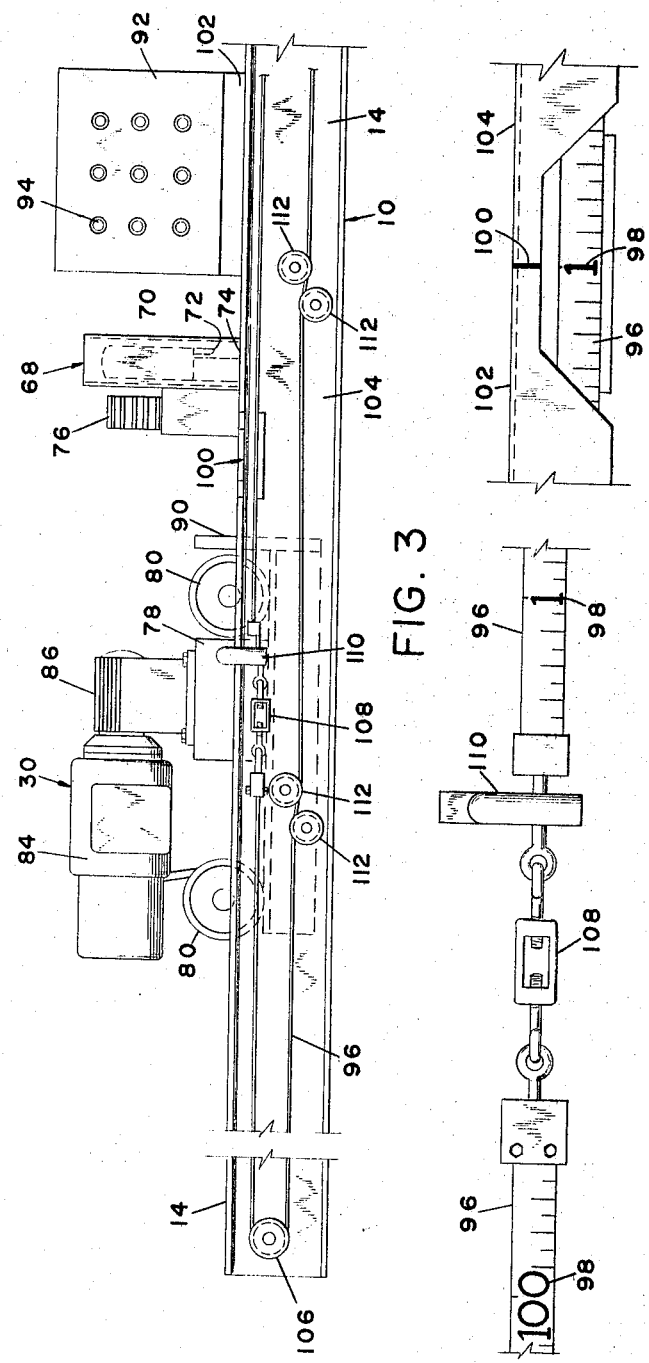
INVENTOR.
THURLOW H. HESS SR.
BY WERTEN DALE BROUGHER
ATTORNEY

United States Patent Office 3,304,824
Patented Feb. 21, 1967

3,304,824
BAR HANDLING AND SHEARING MACHINE
Thurlow H. Hess, Sr., Red Lion, and Werten Dale Brougher, York, Pa.; said Hess assignor to Werten Dale Brougher, doing business as Brocker Mfg. & Supply Co., York, Pa.
Filed July 2, 1965, Ser. No. 469,067
13 Claims. (Cl. 83—104)

This invention pertains to a bar handling and shearing machine, and more particularly, to a machine capable of readily shearing desired lengths of metallic bar stock and the like from relatively long stock lengths of such material, rapidly, and substantially entirely by power operated equipment.

It is customary, particularly in the reinforcing steel industry, to furnish bars of different diameters of reinforcing steel stock in relatively long lengths by a mill, one common length being approximately 60 feet. The various uses of reinforcing steel in connection with constructing and fabricating reinforced concrete structures of different kind require a substantially infinite number of different lengths of reinforcing steel bars of different diameters, many of which are bent into an infinite number of different shapes and contours. The first operation incident to forming desired diameters of such bar stock into required shapes of specific design comprises shearing the raw stock to a desired length prior to bending the same on appropriate equipment into the required configuration for a specific structure in which the shaped rod is to be incorporated.

The reinforcing steel industry is highly competitive, whereby profits, to a large extent, depend upon the efficiency of operation of a particular plant which fabricates the raw stock into required shapes from various diameters of such raw stock as received from the mill which produced it. Hence, the efficient handling of such stock from the time it is received by the fabricating plant to the time it is delivered to the job is of greatest importance in the economics of this particular industry. The present invention is directed primarily to the efficient handling of the raw stock in its initial operation, namely, that of shearing the same into required overall lengths.

Various types of bar shearing machines have been devised heretofore and presently are in use. Essentially, most of these machines include conveyor means of one kind or another for advancing the bar stock past a shearing station for the required distance and then operating shears to sever the stock into desired lengths. Some of the existing machines discharge the cut length by various types of sweeping means which push the severed bars horizontally from one side of the supporting table or mechanism which supports the severed bars after being sheared from stock. Various means are employed for bundling or otherwise handling the severed lengths of bars, most of which operations as presently practiced, however, being of an awkward and inefficient type requiring substantial amounts of time, certain undesirable manual operations, and otherwise resulting in overall operational costs which offer substantial possibilities for improvement.

It is the principal object of the present invention to provide a bar handling and shearing machine which operates at a very high rate of speed to move a traveling stop to a desired distance from the shear means, advances the bar stock against said stop by power means, operates the shear means, and rapidly discharges the severed lengths of bars by gravity, through a minimum amount of travel to a receptacle in which the severed bars may be bundled and tied for removal to subsequent operations or delivery.

It is another object of the invention to utilize in the machine described hereinabove a combination bar supporting and conveying means which also serves as discharge means operating by gravity to dump severed bars through the downward tilting of the supporting and conveying means by lowering one edge thereof which is nearest the front side of the machine and closest to the receptacle means which receive the severed bars, thereby consuming minimum power and operating time.

It is a further object of the invention to provide simple but highly efficient indicating means by which an operator readily and visibly can observe the distance the traveling stop moves relative to the shear means to provide the desired length for the bars to be severed from stock lengths, the traveling stop being moved by power means at a rapid rate of speed.

It is still another object of the invention to provide a plurality of receptacles into which severed bar lengths move quickly and slidably by gravity as dumped by the supporting and conveying means which, preferably, is in the form of a frame-like bed having rotatable rollers spaced longitudinally therealong, some of which are driven by power means to positively and quickly advance the bars into engagement with the traveling stop. The receptacles preferably are of appreciably different lengths respectively to receive relatively long and short cut bar lengths and the present invention also provides means for shunting bars of one length over one of the receptacles for delivery into the other receptacle, the shunting means being operated quickly by power means for movement between operative and inoperative shunting positions.

One further object of the invention is to provide a stationary base frame which supports all portions of the machine, including the aforementioned elongated frame-like bed which supports the bar stock and moves the same into engagement with the traveling stop, one side of said frame-like bed being pivotally supported by the base frame and the machine also including power means normally operable to hold the frame-like bed in horizontal, operative position, but permit rapid lowering or dropping of the non-pivoted sides a limited distance to effect tilting of the frame-like bed which comprises a discharge position thereof that is operable to rapidly dump the severed bars thereon which slide by gravity toward the front side of the base frame into one of the aforementioned receptacles, following which the power means quickly restore the frame-like bed to horizontal, operative position for reception of the next batch of bars to be carried thereby into engagement with the traveling stop for the next severing operation.

One other object of the invention is to provide compact and conveniently located control means for operating all of the power means of the machine, including those which drive the traveling stop, raise and lower the frame-like bed between horizontal and tilted position, rotate the driving rolls of the conveyor on said frame-like bed, and also operate the power means for shifting the shunting mechanism which comprises deflecting means for the severed bars to direct them selectively into one receptacle or another.

Details of the foregoing objects and of the invention, as well as other objects, are set forth in the following specification and illustrated in the accompanying drawings comprising a part thereof.

In the drawings:

FIG. 2 is an exemplary end elevation of the machine shown in FIG. 1 as viewed from the left-hand end thereof, said elevation being on a larger scale than employed in FIG. 1.

FIG. 3 is a fragmentary, foreshortened side elevation of a portion of the main frame upon which is mounted the traveling stop, the shearing mechanism, and a control panel.

FIG. 4 is a fragmentary plan view of a portion of the measurement indicating means and showing details of the mounting thereof.

FIG. 5 is a fragmentary plan view of a detail of the indicating means with respect to a reference point associated therewith.

Figure 1:
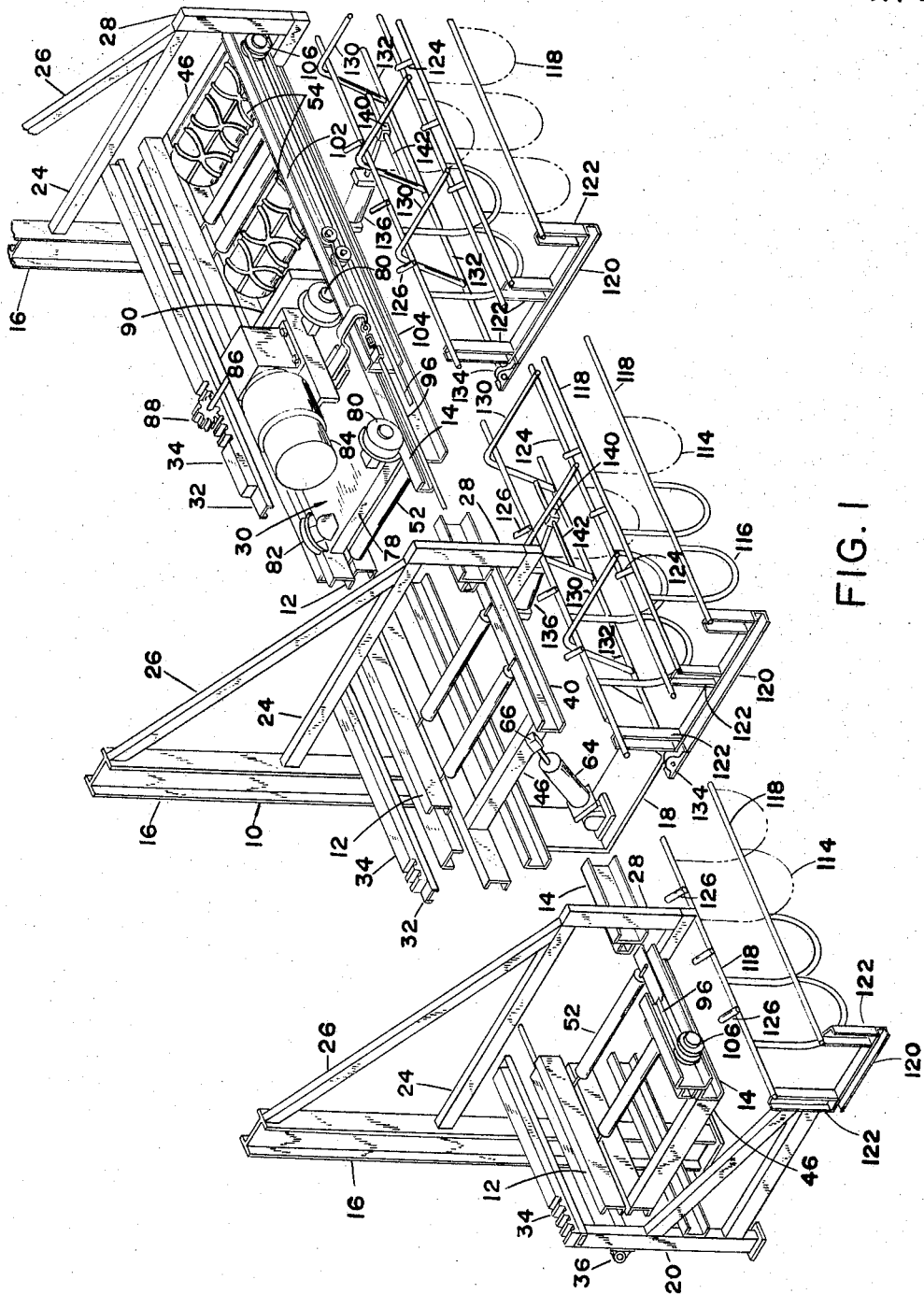
FIG. 1 is a perspective, fragmentary and foreshortened view of a machine embodying the principles of the present invention.

Referring particularly to FIGS. 1 and 2, the machine comprising the present invention includes an elongated base frame 10 which is sufficiently long to accommodate very long bars and, essentially, comprises a pair of elongated structural members comprising side members 12 and 14. Longitudinally spaced vertical supports 16 extend upward from base plates 18 to which auxiliary vertical members 20 are connected at the lower ends. Suitable braces 22 extend between the members 16 and 20 to connect the same.

An elevated, horizontal support 24 extends from each vertical support 16 and is braced by an appropriate diagonal member 26. Vertical suspension members 28 are connected to the outer ends of supports 24 and the elongated side member 14 is interconnected to the lower ends of suspension members 28. It thus will be seen that the parallel side members 12 and 14, which conveniently can be formed from steel channels, are effectively and stationarily supported horizontally and are transversely spaced from each other. Such side members also comprise rails which support the traveling stop unit 30, as hereinafter described.

Extending longitudinally of the base frame 10 and supported by the upper ends of the vertical members 20 is a structural member 32 which may be a channel, the same supporting an elongated toothed rack 34, for purposes to be described. Also mounted on one side of each of the vertical members 20 is a journal bearing 36 and an elongated shaft 38 extends axially through each of the bearings 36 on the members 20 for the entire length of the base frame.

Means to support and propel bar stock from either a stock rack of other supporting means are provided in the machine shown in the figures, the same comprising a frame-like bed 40. Said bed primarily comprises a pair of elongated side members 42 and 44 which are interconnected at intervals by cross-struts 46, the endmost of which comprises end members for the frame of the bed.

Connected to the shaft 38 at intervals are a series of channel members 48 and extending between these channel members and the side member 42 of bed 40 are a series of connecting members 50, whereby the bed 40 is pivotally supported for limited angular movement about the axis of the bearings 36, the limits of movement being best illustrated in FIG. 2, wherein the normal, horizontal operative position of the bed 40 is shown in full lines, while in phantom, the same is shown in its lowered, inclined discharge position for purposes to be described.

Extending transversely between the side members 42 and 44 of bed 40 are a series of rotatable, supporting and transporting or conveying rollers 52 which are preferably mounted on appropriate anti-friction means such as ball bearings or the like so as not to impede the movement of bars longitudinally thereover while being moved along the bed 40 into engagement with the traveling stop 30 after the same has been disposed in a desired position with respect to main frame 10 by mechanism to be described hereinafter.

For purposes of propelling bar stock along bed 40, the bed, especially adjacent the right-hand end thereof as viewed in FIG. 1, is provided with a plurality of spaced driving rollers 54, one of which is shown to advantage in FIG. 2 and several are shown adjacent the right-hand end of FIG. 1. The outer surfaces of said rollers are provided with an exemplary irregular configuration to impart friction thereto and afford ready gripping means with the bar stock being moved thereby along the bed 40.

As best shown in FIG. 2, certain of the cross-struts 46 of bed 40 support power means preferably comprising electric motor units 56 which also include a speed reducer 58 and preferably drive a multiple pulley sheave or sprocket gear 60 which drives a corresponding pair of belts or sprocket chains which extend therearound and also around suitable driven pulleys 62 respectively connected to the shafts projecting from one end of the bearings provided in the side members 42 and 44 of bed 40 for purposes of rotatably supporting the driving rollers 52.

The bed 40 is pivotally movable between the operative, conveying position thereof shown in full lines in FIG. 2 and the phantom discharge position shown therein by power means, the preferred type of which comprises a plurality of fluid-operated cylinder and piston units 64 disposed at appropriate intervals along the length of bed 40. One end of each unit is pivotally connected to the various base plates 18 for example, as illustrated midway of FIG. 1 and the end of the piston rod is connected by a pivoted block 66 to one of the cross struts 46 of bed 40. Appropriate fluid, such as air, which permits rapid operation of the bed 40, is delivered to the lower end of each of the power units 64 from a suitable supply line, not shown, which may for example comprise a pipe extending longitudinally along the base frame at a convenient location and connected by suitable flexible hoses or the like to the lower ends of the cylinders of the unit 64.

Control means for valves to control the discharge of fluid to and from said cylinders are described hereinafter, it being understood that all of the cylinders connected to bed 40 operate in unison. However, in the preferred construction of the bed 40, it is severed transversely intermediately of the ends thereof so as actually to provide two sections in longitudinal alignment with each other and preferably of substantially equal lengths although the relative lengths thereof may be varied in accordance with desired practice. Under such circumstances, an appropriate number of power units 64 will be connected to each of the sections of the bed and said sections may be operated independently of each other or in unison, as desired, for purposes to be described, the control means for the power units under such circumstances being arranged to permit such independent or unison operation of the sections.

Adjacent the right-hand end of the machine illustrated in FIG. 1, but not shown specifically in said figure, is shearing mechanism 68, see FIG. 3, which is of conventional type in heavy-duty metal cutting shear machines of the type to which the present invention pertains. Said shear comprises a pivoted cutting head 70 having a blade 72, which cooperates with a suitable anvil 74, the cutting head 70 being moved into shearing engagement against the anvil by appropriate gear means 76 which is driven by an appropriate motor, not shown, but of conventional type. The location of the shearing mechanism 68 is fixed longitudinally with respect to the base frame 10.

To provide for the shearing of bar stock into various desired lengths, the machine is provided with the traveling stop unit 30 referred to hereinabove and shown in FIGS. 1 and 3. Said unit comprises a body 78 upon opposite sides of which are mounted pairs of supporting wheels 80 and 82, the wheels 80 preferably being flanged at one face for engagement with the side member 14 of base frame 10, while the wheels 82 are disposed obliquely and are provided with angularly related flanges which are complementary to one corner of the side member 12 of base frame 10 as best shown in FIG. 1. This arrangement serves, in conjunction with the flanges of the wheels 80, to maintain the body 78 of the traveling stop accurately in both transverse and vertical directions with respect to the base frame 10 for movement longitudinally therealong.

Also supported by the body 78 is power means preferably comprising an electric motor 84 having a gear reducer 86 thereon which serves to drive a shaft having a toothed pinion gear 88 meshing with the teeth of rack 34 and operable to propel the traveling stop 30 at a rapid speed in either desired longitudinal direction along the base frame 10. From FIGS. 1 and 3, it also will be seen that the traveling stop unit 30 is provided with a vertically extending stop plate 90 against which the leading ends of bar stock abut as moved along the bed 40 as propelled by the driving rollers 54 and as supported by the freely rotatable rollers 52, the bar stock moving past the shearing mechanism 68 while the blade 72 is elevated. To insure that all of the leading ends of a group of bars to be sheared simultaneously will abut the stop plate 90, the driving rollers 54 are rotated for a short period after the first bar engages the stop plate 90, thereby reasonably insuring abutment of the leading ends of all of the bars with said stop plate prior to operation of the shearing mechanism.

Operation of the power means 84 of the travelling stop 30 is controlled by an appropriate switch provided on the control box 92, shown in exemplary manner in FIG. 3. Similarly, the control box 92 includes a series of valves and operating handles or knobs 94 therefor mounted in control lines to the various power cylinders such as those in units 64 for raising and lowering the bed 40, as well as others to be described hereinafter.

For purposes of readily, efficiently and simply enabling the operator to determine the distance between the stop plate 90 of the traveling stop 30 and the shear blade 72, the present invention provides indicating means, best shown in detail in FIGS. 3–5, but also illustrated in smaller scale in FIG. 1. Such indicating means essentially comprise a flexible tape 96, having scale indicia 98 thereon to permit the operator to read the same relative to a reference point or line 100, see FIG. 5, which preferably is provided in the upper flange 102 of a protecting channel 104, best shown in FIG. 1, positioned in the region where the operator stands to observe the indicating means and also to operate the various control members carried by the control box 92 as readily can be visualized from FIG. 3.

The flexible indicating or measuring tape 96 extends around flanged, rotatable pulleys 106 respectively supported by the side members 14 of base frame 10 for example, preferably adjacent opposite ends thereof. The opposite ends of the flexible tape 96 are connected by any suitable tensioning means such as a turn-buckle 108. One end of the tape also is fixed relative to an arm 110 which is fixed to and carried by the body 78 of traveling stop unit 30.

By suitably orienting the indicia of the tape with respect to the reference point or line 100 and also with reference to any selected distance between the stop plate 90 and shear blade 72, after the latter is accurately measured, it will be seen that as the stop unit 30 moves toward and from the shearing blade 72, the flexible indicating tape 96 will correspondingly always be moved with respect to the reference point 100 and thereby accurately and visibly denote the distance between the stop plate 90 and shear blade 72 so as readily to be observed by an operator. In view of the fact that the length of the flexible tape 96 and the scale thereon usually are substantial, appropriate supplemental guide and slack take-up means preferably are provided in the nature of auxiliary flanged rollers 112, usually mounted in closely related pairs and positioned at appropriate locations along the side member 14 of the base frame 10, exemplary showings of which are illustrated in FIG. 3.

After either a single bar or a plurality of bars have been advanced along the bed 40 by the driving rollers 54 into engagement with the stop plate 90 which previously has been set at a predetermined desired location to determine the length of the bars to be sheared from stock, and the shearing mechanism has been operated to cut the desired length of bars from such stock, the bed 40 then is dropped quickly to the inclined, phantom-line position illustrated in FIG. 2 as a result of the fluid pressure in the power unit 64 being instantaneously released to effect very abrupt lowering of the bed and thereby initiating prompt sliding movement of the cut bar pieces laterally from the lower side of the bed 40 for discharge from the machine, by gravity, and with the expenditure of a minimum amount of effort and energy. The initial part of dropping of the bed 40 also jars the severed bars and induces immediate discharge movement from bed 40. By employing gravity to enable the bed 40 to be moved from its operative, horizontal position to its inclined and discharge position, no energy at all is required to actually effect the discharge of the cut bars from the machine, such discharge preferably being from the front side of the machine as viewed in FIG. 2.

For efficient operation of the machine, the present invention provides receptacle means which preferably extend along the front or discharge side of the base frame of the machine and projecting laterally outward therefrom as clearly shown in FIGS. 1 and 2. The receptacle means preferably comprises a pair of channel-like receptacles 114 and 116, the receptacle 114 being positioned closest to the base frame 10, while the receptacle 116 is parallel thereto and positioned slightly outward from the innermost receptacle 114. For convenience and especially for ready access to tie groups of severed bars into bundles, the receptacles 114 and 116 are formed from bar stock which is curved into U-shaped members and said members are connected together suitably by longitudinally extending bars 118, such as by welding. The bars 118, as clearly shown in FIGS. 1 and 2, are supported at intervals by transverse base members 120, which preferably are anchored to a floor for example, and short posts 122, or any other appropriate support means, extend upward from the members 120 for engagement with the bars 118, the same preferably being connected together such as by welding. This arrangement is very rugged and durable.

From FIG. 2 particularly, it will be seen that the top of receptacle 114 is higher than receptacle 116, especially at the side thereof nearest the base frame 10. It also will be seen that the innermost bar defining the upper edge of receptacle 116 has a plurality of short, angularly extending fingers 124 fixed thereto and extending angularly upward into engagement with the outermost upper bar 118 defining one upper edge of the innermost upper receptacle 114. Similarly, the highest and innermost upper bar 118 of the receptacle 114 has additional fingers 126 connected at one end thereto and extending inwardly and upwardly so as to be substantially within a plane common with the upper surface of receptacle 114 as defined by the longitudinal bars 118 thereof, and also co-planar with fingers 124. The upper surface of all of the rollers 52 and driving rollers 54 of the bed 40 likewise will be within said plane when the conveyor bed 40 has been dropped to its discharge, inclined position as shown in FIG. 2 in phantom.

Preferably, the receptacle 116 is substantially shorter than the receptacle 114 as is apparent from FIG. 1. Also, the shorter, outermost receptacle 116 is preferably substantially coextensive with the section of the conveyor bed 40 which is nearest the shearing mechanism 68. In practice and for convenience, it has been found effective to have the receptacle 116 about half as long as the receptacle 114. Accordingly, the longer receptacle 114 is intended to receive the longer ranges of cut bars and the shorter receptacle 116 receives the shorter ranges of cut bars. Further, by providing a pair of receptacles 114 and 116, respectively for the stated purposes, or otherwise, it is apparent that much more rapid production is possible especially in producing groups or bundles of sheared bars, all of common length within the respective bundles but respectively discharged into the two different receptacles, than if only a single receptacle were provided. Hence, the productive capacity of the machine comprising the present invention is greatly increased by the receptacle arrangement described above.

For purposes of effecting the discharge of cut bars into one receptacle or the other, the present invention includes deflecting or shunting means 128 which are best shown in detail, in end view, in FIG. 2 but are also shown advantageously in FIG. 1. Such deflecting means comprise a plurality of longitudinally spaced L-shaped fingers 130. One leg of each finger extends downwardly for connection at the lower end thereof to a pivot bar 132 which is coextensive in length with the shorter receptacle 116.

By virtue of the fingers 130 all being commonly and rigidly connected to the pivot bar 132 which is supported in a suitable number of journal bearings 134 interconnected to the base member 120, said fingers comprise a deflecting or shunting unit in that all of the fingers are actuated simultaneously between extended, deflecting or shunting position as shown in full lines in FIG. 2, or the retracted and inoperative position shown in phantom in FIG. 2. When in the latter, inoperative position, the deflecting unit 128 is disposed compactly beneath the bed 140 and, when in this position, as is seen from FIG. 2, it will in no way interfere with the lowering of the bed 40 to its discharge position.

When the deflecting unit 128 is in the full line, operative position, it will be seen that the portions of the fingers 130 which are outermost with respect to the pivot bar 132 comprise the other legs of the L-shaped members and are disposed within the common plane of the fingers 124 and 126 as well as the upper surface of the rollers of the bed 40 when inclined to discharge position, thereby defining a continuous inclined surface down which a batch of sheared bars may be discharged quickly, by sliding, into the outermost receptacle 116. Such discharge occurs almost instantaneously, particularly by virtue of the jarring effect imparted to the bars as a result of the instantaneous dropping of the bed 40 through the release of the fluid in the power unit 64. It will be understood of course that if only shorter lengths of sheared bars are to be discharged, it is only necessary to drop the section of the bed 40 nearest the shear means, while the outermost section thereof may remain horizontal in operative position, assuming that none of the sheared bars are longer than the first mentioned section of bed 40.

Movement of the deflecting means 128 between the inoperative and operative positions thereof is very efficiently and quickly accomplished by the employment of an appropriate number of power means preferably comprising fluid-operated cylinder and piston units 136 which, if desired, may be at least of a similar nature to the units 64 but need not be as powerful in view of the deflecting unit 128 not being as heavy as the sections of bed 40. Conveniently, one end of the cylinder units may be connected to suitable brackets 138 fixed to base plates 18, while the outer end of the piston rod of each unit is connected suitably to a block 140 mounted for limited rotation upon a frame 10 or cross-bar 142 extending between a pair of fingers 130, as shown in FIG 1, or between a pair of brackets 144 fixed to the selected fingers 130, as illustrated in FIG. 2, if desired, in view of the arrangement shown in FIG. 1.

For purposes of effecting operation of the deflecting unit 128 between its operative and inoperative positions, it is essential that the power units 196 be of the double acting type, whereby it will be necessary to employ delivery lines to opposite ends of the cylinders from suitable fluid supply lines, not shown, but of simple, conventional type. As in regard to the cylinder power unit 64, control valves for the cylinder power unit 136 likewise are embodied in the control box 92 by appropriate delivery lines of conventional nature, such power system being of such conventional type as not to require specific illustration.

After both sections of conveyor bed 40, or only the section thereof nearest the shear means, have been dropped to the discharge position, the same are quickly restored to operative, horizontal position simply by applying fluid pressure to the cylinder power units 64 which operate substantially instantaneously and thereby prevent any excessive waste of operating time. Further, inasmuch as the bed sections are elevated only while empty, it will be seen that a minimum amount of power is required to accomplish this, as distinguished from apparatus in which tilting of a receiving bed, for example, is utilized to discharge bar material therefrom by elevating one side of a loaded bed rather than dropping one side of a loaded bed by gravity as in the present invention. Further, not only is economy of operation effected but speed of operation also is greatly enhanced in that the weight of the sheared bars upon the section or sections of bed 40 facilitate the dropping or lowering thereof to discharge position.

While the invention has been described and illustrated in its several preferred embodiments, it should be understood that the invention is not to be limited to the precise details herein illustrated and described since the same may be carried out in other ways falling within the scope of the invention as claimed.

We claim:

1. A bar handling and shearing machine comprising in combination, a stationary elongated base frame defining at least one side of an elongated path along which bar stock is moved for shearing to desired lengths, shear means adjacent one end of said frame, power means connected to said shear means to operate the same, stop means positionable along said path at desired distances from said shear means and engageable by the leading ends of bar stock as advanced along said path past said shear means into engagement by said stop means, a frame-like bed extending along said base frame and supporting a plurality of rollers extending transversely between opposite sides of said bed to form the bottom of said path and being operable to support and move bar stock upon said bed and along said path, means pivotally supporting one side of said bed for movement of the bed between substantially horizontal position to support and move bar stock therealong and a sloping discharge position extending downwardly from the axis of said pivotally supported side of said bed to permit bars to slide by gravity from the lower side of said bed and from said main frame, elongated receptacle means positioned along and laterally outwardly from said one side of said main frame, fluid-operated power means connected to the side of said bed opposite the pivotally supported side and operable respectively to maintain said side in uppermost supporting position and to instantly release said side to drop to said sloping discharge position and thereafter operable to quickly restore said bed to said uppermost supporting position after such discharging operation, additional elongated receptacle means mounted outwardly from said first-mentioned receptacle means in side-by-side relationship therewith, and deflecting means supported adjacent said first-mentioned receptacle means and movable from a retracted position to an extended position over the top thereof to shunt sheared bars discharged from said bed over the top of said first receptacle by gravity and into said outermost receptacle.

2. The machine according to claim 1 in which said fluid-operated power means is pneumatically powered and comprises a plurality of piston and cylinder units having a pressure end connected to a source of air under pressure, said pressure end also having means to discharge the air pressure directly to atmosphere when said frame-like bed is to be lowered, thereby affording instantaneous lowering of said bed by gravity to discharge cut bars from the lowered side edge of said bed.

3. The machine according to claim 2 further including control means operable to control the supply and release of air under pressure to and from pressure ends of said cylinders simultaneously, said control means being adjacent said shear means.

4. The machine according to claim 1 in which said base frame has a pair of elongated rail-like members spaced transversely to define a channel-like path and at least one of said rail-like means supporting said stop means operatively in stopping position at selected distances from said shear means.

5. The machine according to claim 4 in which said stop means has wheels adjacent opposite sides thereof engaging said rail-like members of said base frame for support thereby.

6. The machine according to claim 1 in which said deflecting means is movable to a retracted position away from the top of said first-mentioned receptacle and beneath said bed when discharge into said first-mentioned receptacle is desired.

7. The machine according to claim 6 in which said receptacles both extend substantially from said shear means toward the opposite end of said base frame, the receptacle nearest said base frame extending substantially to said opposite end of said base frame and the other receptacle being substantially shorter, said longer and shorter receptacles being arranged respectively to receive the relatively longer and shorter lengths of sheared bars, and said bed being severed transversely intermediately of the ends thereof to provide two sections, the section nearest the shear means being tiltable downwardly at one side independently of the other section to discharge short lengths of severed bars no longer than said bed section independently of said other section while the latter remains in operative position.

8. The machine according to claim 4 in which said stop has wheels thereon engaging said rail-like members of said base frame for guided support therealong, an electric motor supported by said stop, an elongated toothed rack supported by said base frame adjacent one side thereof, a pinion gear driven by said motor and engaging said rack to propel said stop along said rails, and means to conduct electric current to said motor.

9. The machine according to claim 1 further including additional driving means carried by said bed and connectable to a source of power, and means connecting said driving means to certain of said rollers spaced longitudinally along said bed and operable to rotate the same in directions to propel bars toward said stop means.

10. The machine according to claim 4 in which said deflecting means comprises a series of similar fingers extending transversely to the axes of said receptacles and means connecting said fingers into a unit, means supporting said unit for movement transverse to the axes of said receptacles from a position at least partially beneath said bed to an operative position extending over the top of said receptacle nearest said base frame and sloping downwardly toward said outermost receptacle to afford sliding movement of sheared bars by gravity over said first-mentioned receptacle and into said outermost receptacle.

11. The machine according to claim 10 in which said finger unit is pivotally supported adjacent the lower portion of said base frame and said fingers of said unit being substantially L-shaped, one leg of each finger being extendable over the top of the receptacle nearest said base frame and the outer end of the other leg of each finger being connected to a bar extending longitudinally of said base frame and supported in bearings to comprise the pivot means for said finger unit.

12. The machine according to claim 10 further including additional power means operable to move said deflecting unit between said positions thereof, said additional power means and said power means for said bed comprising a plurality of fluid operated cylinder and piston units positioned in longitudinally spaced relationship respectively along said deflecting unit and bed, and control valves interconnected to said power means to actuate the same.

13. The machine according to claim 1 further including indicating means comprising an endless flexible tape supported by means on said base frame adjacent said shear means, power means to actuate said defletcing means, and control means for operation of said power means for said bed and deflecting means positioned in a control center adjacent said reference means for ready actuation by an operator with maximum efficiency.

References Cited by the Examiner

UNITED STATES PATENTS

| | | | |
|---|---|---|---|
| 722,265 | 3/1903 | Swyers | 83—157 X |
| 771,836 | 10/1904 | Schantz | 83—157 |
| 1,150,541 | 8/1915 | Ryan | 83—157 |
| 2,397,192 | 3/1946 | Meyerbauch | 83—157 |
| 2,815,074 | 12/1957 | Dehn | 83—268 X |
| 3,141,367 | 7/1964 | Keener et al. | 83—268 X |
| 3,178,982 | 4/1965 | Modder | 83—467 |

FOREIGN PATENTS 605,756 9/1960 Canada.

WILLIAM W. DYER, Jr., *Primary Examiner.*

J. M. MEISTER, *Assistant Examiner.*